United States Patent [19]

Bergner

[11] Patent Number: 4,714,391
[45] Date of Patent: Dec. 22, 1987

[54] EXPANSION ANCHOR ASSEMBLY

[75] Inventor: Arndt Bergner, Munich, Fed. Rep. of Germany

[73] Assignee: Hilti Aktiengesellschaft

[21] Appl. No.: 887,324

[22] Filed: Jul. 21, 1986

[30] Foreign Application Priority Data

Jul. 22, 1985 [DE] Fed. Rep. of Germany ....... 3526094

[51] Int. Cl.⁴ .............................................. F16B 13/06
[52] U.S. Cl. ...................................... 411/54; 411/55; 411/60
[58] Field of Search .................. 411/44, 54, 55, 57, 411/60

[56] References Cited

U.S. PATENT DOCUMENTS

| 445,332 | 1/1891 | Phillips | 411/54 |
| 1,031,462 | 7/1912 | Paine | 411/57 |
| 2,099,678 | 11/1937 | Curtis | 411/55 X |
| 4,293,259 | 10/1981 | Liebig . | |
| 4,370,081 | 1/1983 | Briles | 411/54 X |
| 4,600,036 | 7/1986 | Noe | 411/44 X |

FOREIGN PATENT DOCUMENTS

| 2552552 | 6/1971 | Fed. Rep. of Germany | 411/55 |
| 2114036 | 10/1972 | Fed. Rep. of Germany | 411/60 |
| 2632487 | 1/1978 | Fed. Rep. of Germany | 411/55 |
| 2909749 | 8/1980 | Fed. Rep. of Germany | 411/57 |
| 3105038 | 9/1982 | Fed. Rep. of Germany | 411/57 |
| 48678 | 11/1930 | Norway | 411/60 |

Primary Examiner—Gary L. Smith
Assistant Examiner—Rodney M. Lindsey
Attorney, Agent, or Firm—Toren, McGeady & Associates

[57] ABSTRACT

An expansion anchor assembly for use in a borehole with an annular undercut includes a threaded anchor stud with a head part at its leading end inserted first into the borehole. Locking elements are arranged around the anchor stud at the head part, a conically shaped member is arranged to expand the locking elements in the radial direction, and an annular abutment member is in threaded engagement with the anchor stud and is arranged to axially displace the conically shaped member. By threading the abutment member toward the leading end of the anchor stud, the locking elements are displaced radially outwardly in the annular undercut. The radially outer surface of the abutment member is located within the axial projection of the radial outer surface of the conically shaped member. Accordingly, the abutment member and conically shaped member can be countersunk relative to a part to be secured to the material in which the borehole is formed. The extent of the countersink relative to the part varies according to the location of the annular undercut so that a complete anchoring of the part is ensured in every case.

5 Claims, 4 Drawing Figures

EXPANSION ANCHOR ASSEMBLY

BACKGROUND OF THE INVENTION

The present invention is directed to an expansion anchor assembly for use in boreholes with an annular undercut formed in a receiving material. The assembly includes a threaded anchor bolt, a head part at the leading end of the anchor bolt first inserted into the borehole, and locking elements located around the anchor bolt and supported against the head part. A conical sleeve is arranged to contact the locking elements and displace them radially outwardly into the annular undercut. An abutment member is axially displaceable along the threaded anchor stud toward the leading end thereof for displacing the conical sleeve into expanding engagement with the locking elements.

In a known expansion anchor assembly, a conically shaped sleeve is displaced in the insertion direction of the expansion anchor into the borehole along a threaded anchor rod so that it displaces locking bodies radially outwardly into an undercut in the borehole. In the expanding operation, the conically shaped sleeve moves into a gap between the locking bodies and the anchor bolt.

The axial displacement of the conically shaped sleeve is effected by an abutment member in the form of a tensioning nut threaded onto the anchor bolt with a washer located between the nut and the conically shaped sleeve. Such an abutment also serves to secure a part onto the surface of the material into which the borehole is formed.

A considerable disadvantage of this known expansion anchor assembly is that the axial arrangement of the undercut determines the position of the abutment. Therefore, the correct axial arrangement of the undercut must be determined based on the thickness of the part to be secured by the expansion anchor assembly, that is, based on the different thicknesses of the parts, the undercut must be located in a different axial position.

SUMMARY OF THE INVENTION

The primary object of the present invention is to provide an expansion anchor assembly with locking elements which can be displaced radially outwardly into an undercut in a borehole so that the expansion anchor assembly can achieve the attachment of parts to the surface of the material in which the borehole is formed independently, to a great extent, of the axial location of the undercut within the borehole.

In accordance with the present invention, an abutment member has a radially outer surface within the axial projection of the radially outer surface of the conically shaped member and the abutment member includes means for the engagement of a tool with the abutment member so that a turning moment can be applied for threading the abutment member on the anchor stud toward the leading end of the stud.

The arrangement of the expansion anchor assembly embodying the present invention, permits the insertion of the assembly through an opening in the part to be attached to the surface of a receiving material into a borehole formed in the receiving material. The conically shaped member can extend outwardly from the opening in the part to be attached. During the anchoring operation, the conically shaped member and the abutment member can be axially displaced toward the leading end of the anchor stud so that they reach a countersunk position relative to the opening in the part. The extent of the countersink varies according to the axial location of the undercut in the borehole. In each instance, however, an effective anchoring is obtained by the complete engagement of the locking elements within the undercut.

In the anchoring procedure, an appropriate tool is engaged in the end surface of the abutment member facing out of the borehole so that the abutment member can be threaded on to the anchor stud. When the abutment member displaces the conically shaped member in the insertion direction within the borehole, the locking elements are displaced radially outwardly into engagement with the annular undercut. With the engagement in the undercut effected, a nut can be placed on the threaded anchor stud projecting out of the part to be secured for clamping the part against the surface of the receiving material.

The complete radial displacement of the locking elements can be displayed visually by a marker or indicator on the threaded anchor stud which is uncovered by the abutment member, as the abutment member is threaded toward the leading end of the anchor stud, when the locking elements are completely displaced radially.

In another embodiment of the expansion anchor assembly, according to the present invention, there is the advantageous arrangement, known per se, of obtaining the displacement of the locking element by means of a pretensioned spring element. Preferably, the spring element is supported in the insertion direction at the conically shaped member and directly or indirectly supported at the abutment member in the direction opposite to the insertion direction of the assembly. It is also possible, however, to position the spring element between the head part on the anchor bolt and the locking elements.

For effecting anchoring, the expansion anchor assembly, along with the pretensioned spring element, is inserted into a borehole in a receiving material passing through an opening in the part to be secured to the receiving material which is axially aligned with the borehole. The locking elements reach the axially extending region of the annular undercut when the conically shaped member and the abutment reach a countersunk position in which position the locking elements can be directed radially outwardly into engagement with the undercut by the spring element. Accordingly, the spring element relaxes at least partially. Then the abutment can be threaded further on the anchor stud in the insertion direction, whereby the spring element is again tensioned and an indicator on the anchor stud is exposed for displaying that the locking elements are in engagement with the undercut. In the engaged position of the locking elements, the threaded anchor stud projects outwardly through the part to be mounted on the receiving material, and the part can be held against the receiving material by threading a nut on the stud into securing contact with the part. To prevent the rotation of the anchor stud when the abutment member or the nut are being threaded on to it, conventional rotational blocking means, acting between the anchor stud and the borehole surface, can be utilized.

In one embodiment of the present invention, it has been found advantageous to support the abutment member at the trailing end of the conically shaped member. Such an arrangement can be effected with the spring element as an intermediary part. It is advisable to form the abutment member as a sleeve-shaped or ring-shaped component.

In one preferred embodiment, the abutment member is supported in a recess at the trailing end of the conically shaped member, that is, spaced axially from the conically shaped end of the member. In such an arrangement, the diameter of the recess corresponds at least to the largest diameter dimension of the abutment member. Accordingly, the abutment member can be countersunk in the trailing end of the conically shaped member. This construction affords an elongated transverse support in the borehole as well as in the opening through the part to be secured, with an overall short axial length of the conically shaped member, and, accordingly, of the axial portion of the expansion anchor assembly projecting into the borehole. The conically shaped member can provide a supporting function up to the outwardly facing surface of the part to be secured.

The means for engaging a tool in the outwardly facing surface of the abutment member are formed as axially extending holes located diametrically opposite one another. Two such axial holes are preferred. Since the torque for threading the abutment member on the anchor stud is introduced by the tool into the outwardly facing surface of the abutment member, for the sake of simplicity, the outer contour of the outwardly facing surface has a circular shape in axial projection.

Moreover, the present invention affords a suitable tool for applying torque to the abutment member. In one feature of the invention, the tool is provided with axially extending pins located diametrically opposite one another which can be inserted into the axially extending holes in the outwardly facing surface of the abutment member. The pins are secured to a carrier. The carrier can be constructed as a disc-shaped member with a diameter noticeably greater than the outside diameter of the conically shaped member so that the manual application of torque at the carrier is easily effected.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
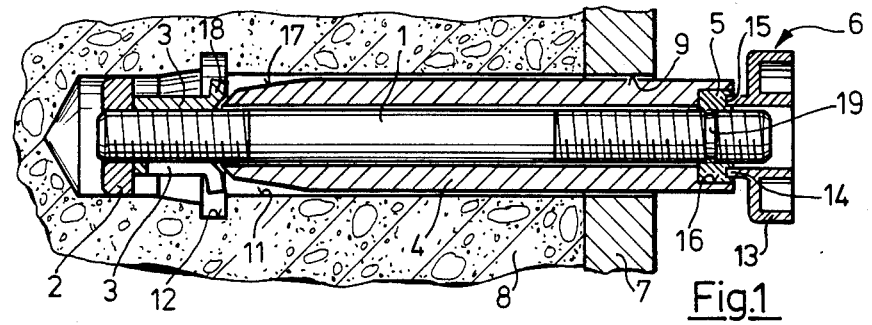
FIG. 1 is an axially extending sectional view of an expansion anchor assembly/embodying the present invention, inserted into a borehole with the assembly in the unexpanded condition and with a tool secured to the trailing end of the assembly.
Figure 2:
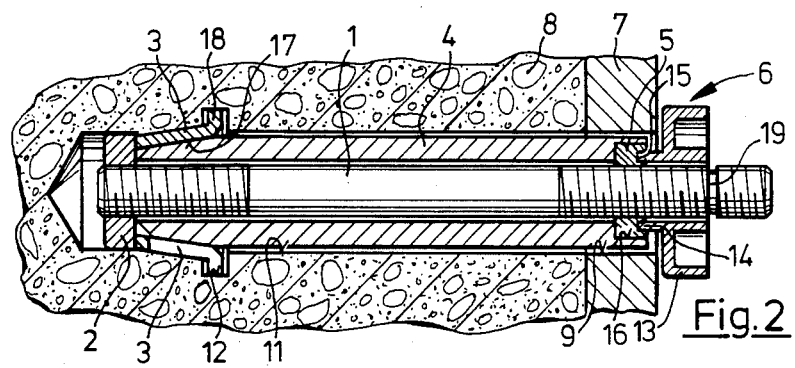
FIG. 2 is a view similar to FIG. 1, however, with the expansion anchor assembly in the expanded condition.
Figure 3:
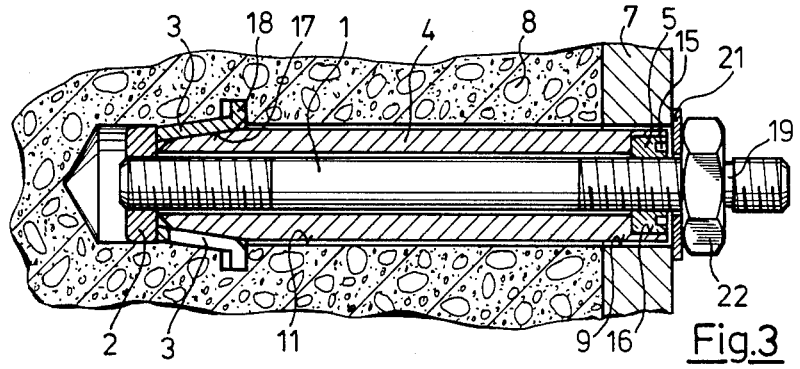
FIG. 3 is a view similar to FIGS. 1 and 2 displaying the expansion assembly in the expanded condition and securing a part in place.

In FIGS. 1-3 an expansion anchor assembly is illustrated inserted into a borehole 11 in a hard receiving material. At the inner end of the borehole an annular undercut 12 has been formed. As viewed in FIGS. 1-3 the leading end of the anchor dowel assembly and its components is the left-hand end, that is, the end first inserted into the borehole 11 and the right-hand end or surface is the trailing end.

The expansion anchor assembly includes an axially elongated threaded anchor stud 1, a head part 2 is fitted onto the leading end of the anchor stud and extends radially outwardly from the stud having an outside diameter approximately equal to the diameter of the borehole 11. Locking elements 3, extending in the axial direction of the anchor stud 1 extend from the trailing surface of the head part toward the trailing end of the anchor bolt and the trailing ends of the locking elements are provided with radially outwardly directed projections 18. An axially extending sleeve or conically shaped member 4 has its leading end located at the trailing end of the locking elements and its trailing end projecting outwardly from a part 7 to be secured to the receiving material 8, as shown in FIG. 1. A nut-like abutment member 5 is located in threaded engagement with the trailing end part of the anchor stud 1 and is seated within a cylindrically shaped recess 16 in the trailing end of the conically shaped member 4. The conically shaped member 4 has its conically shaped section 17 located at its leading end with the section 17 extending from the leading end for a portion of the axial length of the member toward the trailing end. To thread the abutment member 5 on to the anchor stud 1, a turning moment is introduced to the abutment member by a tool 6 shown in FIG. 1 extending around the trailing end of the anchor bolt 1.

The expansion anchor assembly is used to fix a flat or planar shaped part 7 against the surface of the receiving material 8 in which the borehole 11 is formed. Accordingly, the expansion anchor assembly is inserted through an opening 9 in the part 7 into the borehole 11 in the receiving material. The annular undercut in the borehole is spaced axially from the surface of the receiving material.

Torque or turning moment is applied manually to the abutment member 5 via a disc-shaped carrier 13 on the tool 6 to achieve the securement of the anchor stud within the borehole. Carrying pins or studs 14 on the leading surface of the carrier 13 project into a pair of diametrically opposed holes 15 in the trailing face surface of the abutment member 5 for transmitting the turning movement to the abutment member for moving it axially along the anchor stud toward the leading end thereof. The conically shaped member 4 with the cylindrically shaped recess 16 in its trailing end is arranged to receive the abutment member 5 in a countersunk manner so that the trailing end of the conically shaped member and the trailing face surface of the abutment member are flush. The abutment member bears against the base of the recess 16 so that the conically shaped member 4 is displaced axially along with the abutment member 5 relative to the anchor stud 4 when the abutment member is threaded in the insertion direction, that is, toward the leading end of the borehole 11. As the conically shaped member 4 is moved in the insertion direction, its conically shaped section 17 moves between the shell-like locking elements 3 and the anchor stud 1 for displacing the locking elements radially outwardly, note FIG. 2. As can be seen in FIGS. 1-3, the axially extending conically shaped section 17 has two different conically shaped parts with the leading end part fitting into a corresponding conically shaped annular space in the trailing ends of the locking elements 3. The radially outwardly directed projections 18 at the trailing ends of the locking elements 3 move outwardly into the annular undercut 12 and are secured in this displaced position, as shown in FIG. 2, by the arrangement of the conically shaped section 17 fitted between the locking elements 3 and the surface of the anchor stud. In the anchoring procedure, the conically shaped member 4 and the abutment member 5 have been displaced axially from the position shown in FIG. 1, located axially outwardly from the outwardly facing surface of the part 7 to the position in FIG. 2 with the trailing end of the conically shaped member and the abutment being located inwardly from the surface of the part 7 within the opening 9.

When the anchored position has been attained, an annular indicator or marker 19 on the anchor stud 1 projects outwardly through the tool 6, note FIG. 2, so that the tool operator is signaled that the locking elements 3 have been engaged within the annular undercut 12.

With the locking elements 3 located in the engaged position, the tool 6 is removed from the abutment member 5 and the part 7 is tightened against the surface of the receiving material 8 by a washer 21 and a nut 22, note FIG. 3.

Figure 4:
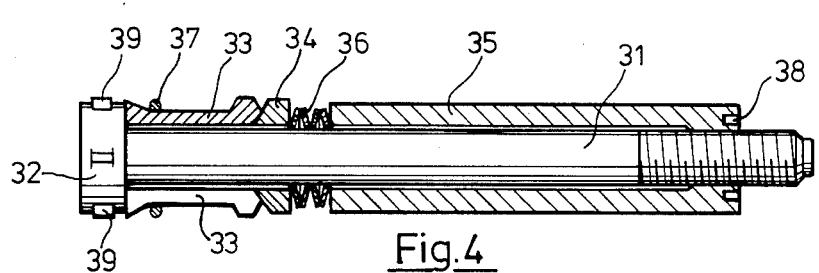
FIG. 4 is an axially extending sectional view of another embodiment of an expansion anchor assembly incorporating the present invention with the assembly shown in the unexpanded condition.

Another embodiment of the present invention is shown in FIG. 4 illustrating an expansion anchor assembly. As viewed in FIG. 4 the left-hand end is the leading end of the assembly. This expansion anchor assembly is made up of an axially elongated anchor stud threaded for a portion of its trailing end and with a radially outwardly extending head part 32 at its leading end. Locking elements 33 are arranged around the leading end portion of the anchor stud 31 extending from the head part toward the trailing end of the anchor stud. These locking elements are arranged to be displaced radially outwardly for effecting the locking engagement of the assembly. An annular sleeve-like conically shaped member 34 is positioned at the trailing end of the locking element and an axially extending sleeve-shaped abutment member 35 is located around the anchor stud and extends from adjacent the trailing end of the stud to close to the conically shaped member 34. A spring element 36 made up of a number of plate springs is located axially between the leading end of the abutment member 35 and the trailing end of the conically shaped member 34.

In use, the expansion anchor assembly is inserted into a borehole in a receiving material in the unexpanded condition as shown in FIG. 4. By pretensioning the spring element 36 the conically shaped member 34 is biased in the insertion direction toward the leading end of the borehole tending to move axially between the locking elements 33 and the surface of the anchor stud when the locking elements reach the region of the borehole containing the annular undercut so that the locking elements are displaced radially outwardly. During the insertion operation while the locking elements are biased radially outwardly, they are held concentrically around the anchor stud by a resilient retaining ring 37. Subsequently, by threading the abutment member 35 in the insertion direction, the abutment member 35 presses against the spring element 36 causing the spring element to be tensioned and to press the conically shaped member 34 toward the leading end of the borehole so that the conically shaped member is held in a secure position for pressing the locking elements 33 radially outwardly.

The rotation of the abutment member 35 is achieved by a tool, such as shown in FIGS. 1 and 2, which engages in the holes 38 formed in the trailing face surface of the abutment member 35. To prevent rotation of the anchor stud 31 during the threading on or rotation of the abutment member 35, nose-shaped projections 39 are formed on the radially outer surface of the head part and bear against the surface of the borehole in a friction-locking manner.

The expansion anchor assembly illustrated in FIG. 4 functions in the same manner as the assembly displayed in FIGS. 1-3.

While specific embodiments of the invention have been shown and described in detail to illustrate the application of the inventive principles, it will be understood that the invention may be embodied otherwise without departing from such principles.

I claim:

1. Expansion anchor assembly for use in an axially elongated borehole extending inwardly from the surface of a receiving material with an annular undercut in the borehole spaced inwardly from the receiving material surface, comprising an axially elongated threaded anchorr stud having a leading end and a trailing end with the leading end arranged to be inserted first into the borehole, a head part secured on said anchor stud at the leading end thereof with said head part extending radially outwardly from said anchor stud, locking elements extending in the axial direction of said anchor stud and extending from said head part toward the trailing end of said stud, a conically shaped member encircling said anchor stud and in contact with the ends of said locking elements spaced from said head part and being displaceable in the axial direction of said anchor stud toward the leading end thereof relative to said locking elements for radially outwardly displacing said locking elements into the annular undercut, and annular abutment member in threaded engagement with said anchor stud and arranged adjacent said conically shaped member for axially displacing said conically shaped member toward the leading end of said anchor stud, wherein the improvement comprises that said annular abutment member has an axially extending outer surface located within the axial projection of the radially outer surface of said conically shaped member, and said abutment member has a surface extending transversely of the axial direction of said anchor stud and facing away from the leading end of said anchor stud, the end of said abutment member closer to the leading end of said anchor stud and means in said surface of said abutment member for engaging a tool for threading said abutment member on said anchor stud bears against said conically shaped member, said conically shaped member is axially elongated and has end surface facing away from the leading end of said anchor bolt, an axially extending recess formed in the end surface of said conically shaped member, the diameter of said recess corresponds to at least the maximum diameter of said abutment member.

2. Expansion anchor assembly, as set forth in claim 1, wherein said means in said surface of said abutment member comprise at least a pair of axially extending holes formed in said surface and extending in the axial direction of said anchor stud with at least two of said holes located diametrically opposite one another.

3. Expansion anchor assembly, as set forth in claim 2, comprising a tool, having a surface arranged to face toward said surface of said abutment member, axially extending pins projecting from said tool and arranged to engage within the diametrically opposed holes in said surface of said abutment member so that by rotating said tool said abutment member can be threaded on said anchor stud toward the leading end thereof.

4. Expansion anchor assembly, as set forth in claim 1, wherein said locking elements each have a first end arranged to bear against said head part and a second end spaced axially from said head part and arranged to bear against said conically shaped member, the second ends of said locking elements being bent radially outwardly out of the axial direction of said anchor stud, and the second ends of said locking elements forming an annular conically shaped recess.

5. Expansion anchor assembly, as set forth in claim 4, wherein said conically shaped member has an axially extending conically shaped section extending from the end thereof closer to the leading end of said anchor stud toward the trailing end of said anchor stud with said conically shaped section extending axially for only a portion of the axial length of said conically shaped member.

* * * * *